(12) United States Patent
Ma

(10) Patent No.: US 9,871,885 B2
(45) Date of Patent: Jan. 16, 2018

(54) SOCKET PROCESSING METHOD AND DEVICE AND WEB SERVER

(71) Applicant: ZTE Corporation, Shenzhen (CN)

(72) Inventor: Wenjuan Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 323 days.

(21) Appl. No.: 14/438,681

(22) PCT Filed: Aug. 26, 2013

(86) PCT No.: PCT/CN2013/082305
§ 371 (c)(1),
(2) Date: Apr. 27, 2015

(87) PCT Pub. No.: WO2014/067327
PCT Pub. Date: May 8, 2014

(65) Prior Publication Data
US 2015/0271294 A1    Sep. 24, 2015

(30) Foreign Application Priority Data

Oct. 30, 2012 (CN) .......................... 2012 1 0423993

(51) Int. Cl.
*G06F 15/16* (2006.01)
*H04L 29/08* (2006.01)
(Continued)

(52) U.S. Cl.
CPC ............ *H04L 67/325* (2013.01); *H04L 67/02* (2013.01); *H04L 67/22* (2013.01); *H04L 67/42* (2013.01); *H04W 12/08* (2013.01)

(58) Field of Classification Search
None
See application file for complete search history.

(56) References Cited

U.S. PATENT DOCUMENTS 6,212,572 B1 * 4/2001 Aydin .................... G06F 9/544
                                                             719/312
6,678,246 B1    1/2004 Smyth
(Continued)

FOREIGN PATENT DOCUMENTS

CN        101119363 A    2/2008
CN        101551821 A    10/2009
(Continued)

OTHER PUBLICATIONS

International Search Report of PCT/CN2013/082305 dated Dec. 12, 2013.
(Continued)

*Primary Examiner* — Younes Naji
(74) *Attorney, Agent, or Firm* — Banner & Witcoff, Ltd.

(57) ABSTRACT

A method for processing a Socket, an apparatus for processing the Socket and a Web server is provided. The method includes: monitoring a client request of a port of the Web server; according to the monitored client request, registering a Socket event through an asynchronous selection operation; judging whether the Socket event is a READ event and/or a WRITE event, to obtain a judgment result; when the judgment result indicates that the Socket event is a READ event and/or a WRITE event, starting timing; and when the timing reaches a preset threshold and the Web task does not receive a first semaphore sent by a Socket underlying layer, sending a second semaphore to the Web task, to enable the Web task to be activated, and processing a corresponding procedure is processed according to the Socket event; closing the Socket event.

3 Claims, 4 Drawing Sheets

(51) Int. Cl.
    *H04W 12/08*     (2009.01)
    *H04L 29/06*     (2006.01)

(56) References Cited

U.S. PATENT DOCUMENTS

| | | |
|---|---|---|
| 2005/0097537 A1 | 5/2005 | Laura |
| 2008/0104025 A1 | 5/2008 | Dharamshi et al. |
| 2009/0083455 A1* | 3/2009 | Sun .................. G06F 9/544 710/46 |
| 2010/0217842 A1* | 8/2010 | Shuster ............ H04L 29/12594 709/220 |
| 2012/0209975 A1* | 8/2012 | Zong ................ H04N 1/00464 709/223 |
| 2012/0271972 A1 | 10/2012 | Eilebrecht |

FOREIGN PATENT DOCUMENTS

| | | |
|---|---|---|
| CN | 102045654 A | 5/2011 |
| CN | 102196002 A | 9/2011 |
| CN | 102420861 A | 4/2012 |
| CN | 102938783 A | 2/2013 |

OTHER PUBLICATIONS

Evaluating Network Processing Efficiency with Processor Partitioning and Asynchronous I/O, EuroSys 06, Apr. 18-21, 2006 Leuven Belgium, 14 pages.

* cited by examiner

SOCKET PROCESSING METHOD AND DEVICE AND WEB SERVER

TECHNICAL FIELD

The present document relates to the communication field, and in particular, to a method for processing a Socket and apparatus, and a Web server.

BACKGROUND OF THE RELATED ART

The user interface based on the browser (webUI) has already increasingly extensively replaced the UI software at the PC side and applied to the device of uFi type and the device of data card type, and the browsers built in the clients, such as, the computer, the mobile phone, etc. can inquire and modify the basic configuration of the data card or uFi conveniently and rapidly through visiting the webUI. The application of the webUI must be based on the Web server, and the main function of the Web server is to provide the online information browsing service. The communication technology used when setting up the network connection between the Web server and the client, such as, the computer, the mobile phone, etc., is called Socket. However, the Socket communication mechanism of the embedded Rex system is different from the Socket mechanism of the embedded Linux system, which is a specific asynchronous unblocking-mode Socket on that platform, therefore, it is different from the synchronous blocking-mode Socket, and it does not have an overtime mechanism, because it does not need the overtime mechanism at all under the normal situation.

We find that, in the practice process, almost all the computers and intelligent mobile phones can visit the Web server very smoothly through their own browsers, however, a certain series of MAC notebook from Apple company will have a certain problem when visiting the Web server: after the browser of the MAC notebook opens the WebUI smoothly and performs the browsing or operation for some time, the problem that it cannot continue browsing or operating will appear.

Through analysis, the presentation reason of the problem is that the Web task cannot receive the semaphore sent by the Socket underlying layer and it is in the waiting state all the time, and it is unable to continue processing the procedures, such as, connecting, reading, writing, closing, etc. Now the Web server is unable to be visited by the client. It is discovered through further analysis that, the Web task cannot receive the semaphore sent by the Socket underlying layer, which is because the Socket underlying layer does not monitor and obtain any Socket event of the client. It is discovered through capturing the TCP packet of the 80 monitoring port that, because of a certain reason of the MAC client, it will no longer send any Socket request to the monitoring port.

SUMMARY OF THE INVENTION

The objective of the embodiment of the present invention is to provide a method for processing a Socket and apparatus, and a Webserver; and the Web server can still be visited when the client is abnormal.

In order to realize the above-mentioned objective, the embodiment of the present invention provides a method for processing a Socket, applied in a Web server, wherein the Web server is based on a platform for providing an asynchronous unblocking-mode Socket; and the method for processing a Socket comprises:

monitoring a client request of a port of the Web server;

according to the monitored client request, registering a Socket event through an asynchronous selection operation;

judging whether the Socket event is a READ event and/or a WRITE event, to obtain a judgment result;

when the judgment result indicates that the Socket event is a READ event and/or a WRITE event, starting timing;

when the timing reaches a preset threshold and the Web task does not receive a first semaphore sent by a Socket underlying layer, sending a second semaphore to the Web task, to enable the Web task to be activated, and processing a corresponding procedure according to the Socket event.

The above-mentioned method for processing a Socket further comprises:

after sending a second semaphore to the Web task, to enable the Web task to be activated, and processing a corresponding procedure according to the Socket event when the waiting timing reaches a preset threshold and the Web task does not receive a first semaphore sent by a Socket underlying layer, closing the Socket event.

In the above-mentioned method for processing a Socket, wherein the platform for providing the asynchronous unblocking-mode Socket is an embedded Rex system.

In the above-mentioned method for processing a Socket, wherein the port of the Web server is an 80 port.

In order to realize the above-mentioned objective, the embodiment of the present invention further provides an apparatus for processing a Socket, applied in a Web server, wherein the Web server is based on an embedded Rex system; and the apparatus for processing a Socket comprises:

a monitoring module, configured to: monitor a client request of a port of the Web server;

a registration module, configured to: according to the monitored client request, register a Socket event through an asynchronous selection operation;

a judgment module, configured to: judge whether the Socket event is a READ event and/or a WRITE event, to obtain a judgment result;

a timing module, configured to: when the judgment result indicates that the Socket event is a READ event and/or a WRITE event, start timing;

a semaphore sending module, configured to: when the timing reaches a preset threshold and the Web task does not receive a first semaphore sent by a Socket underlying layer, send a second semaphore to the Web task, to enable the Web task to be activated, and process a corresponding procedure according to the Socket event.

The above-mentioned apparatus for processing a Socket further comprises:

a Socket closing module, configured to: after sending a second semaphore to the Web task, to enable the Web task to be activated, and processing a corresponding procedure according to the Socket event when the waiting timing reaches a preset threshold and the Web task does not receive a first semaphore sent by a Socket underlying layer, close the Socket event.

In the above-mentioned apparatus for processing a Socket, wherein the platform for providing the asynchronous unblocking-mode Socket is an embedded Rex system.

In the above-mentioned apparatus for processing a Socket, wherein the port of the Web server is an 80 port.

In order to realize the above-mentioned objective, the embodiment of the present invention further provides a Web server, which is based on a platform for providing an asynchronous unblocking-mode Socket, comprising an apparatus for processing a Socket described in any one of the above-mentioned descriptions.

In the embodiment of the present invention, when the client is abnormal and when the Web task is suspended all the time because of being unable to receive the semaphore, the timing is started; when the timing reaches the preset threshold and the Web task does not receive the first semaphore sent by the Socket underlying layer, the second semaphore is sent to activate the Web task, which enables the Web task to process the corresponding procedures according to the Socket event and close the abnormal Socket event, so that the client re-initiate the connection with the Web server end, to realize the operation of visiting the Web server continuously, that is, the Web server can still be visited.

PREFERRED EMBODIMENTS OF THE PRESENT INVENTION

Figure 1:
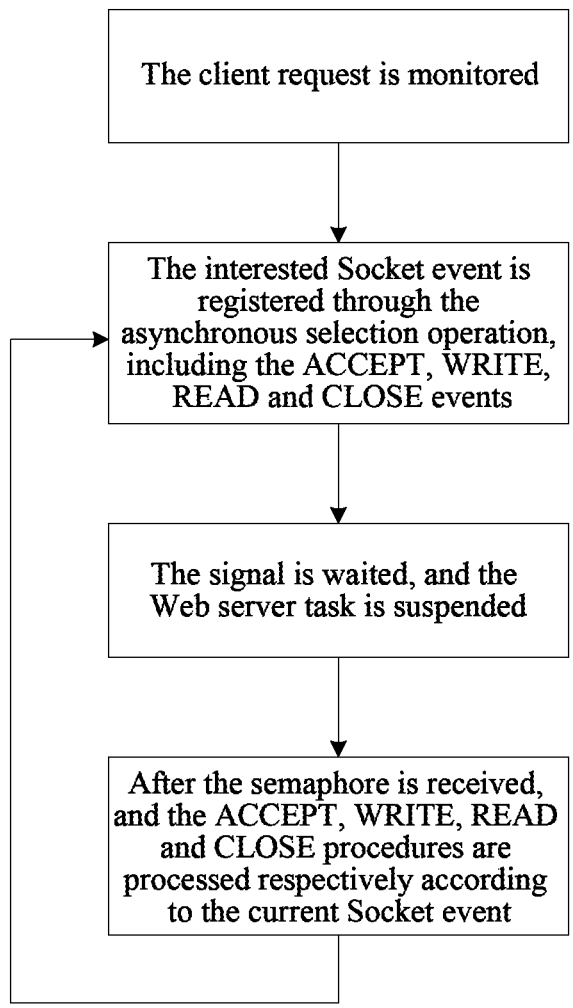
FIG. 1 is a flow chart of realizing a Socket in the related art.

The process of realizing the Socket in the related art is first introduced hereinafter, as shown in FIG. 1.

The client request is monitored;

the asynchronous selection operation is performed to register the interested Socket event according to the monitored client request; and the Web task will be in the state of waiting for the semaphore, that is, the task waiting for the semaphore is equivalent to a task being suspended temporarily without performing any activity.

After the semaphore is received, the Web task is activated, and the Web task processes the accept (connect), read, write or close procedures respectively according to the current Socket event.

It can be seen that, through the above-mentioned processes, after the asynchronous selection operation registers the interested Socket event, the Web task will be in the state of waiting for the semaphore, and the Web task can only be activated again until the required semaphore is received, to continue processing the procedures, such as, accept, read, write, close, etc. What the Socket communication mechanism based on Rex system adopts is the asynchronous unblocking-mode Socket, therefore, the semaphore mechanism does not have the waiting overtime mechanism, the task will wait all the time if the wanted semaphore is not received, and it cannot be activated.

Figure 2:
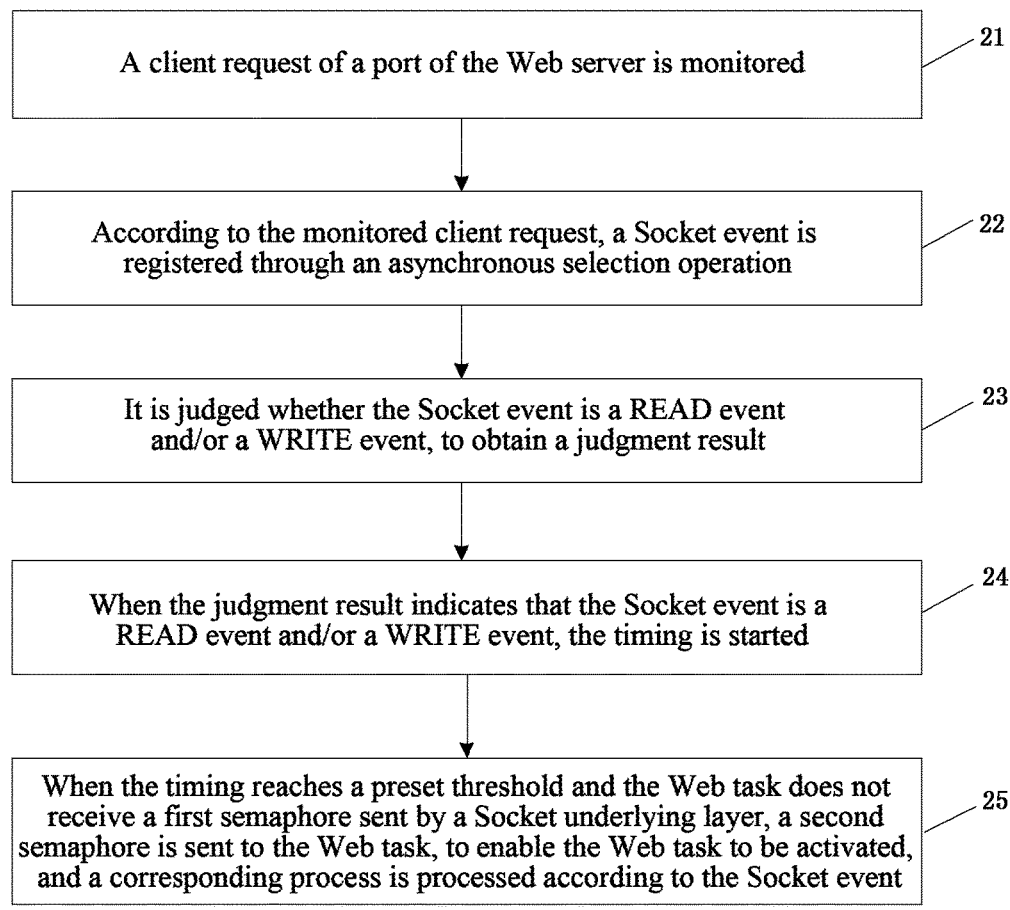
FIG. 2 is a flow chart of a method for processing a Socket in an embodiment of the present invention.

In order to solve the above-mentioned problem, the embodiment of the present invention provides a method for processing a Socket applied in a Web server, and the Web server is based on a platform for providing an asynchronous unblocking-mode Socket, as shown in FIG. 2, and the method for processing a Socket includes the following steps.

In step 21, a client request of a port of the Web server is monitored.

In step 22, according to the monitored client request, a Socket event is registered through an asynchronous selection operation.

In step 23, it is judged whether the Socket event is a READ event and/or a WRITE event, to obtain a judgment result.

In step 24, when the judgment result indicates that the Socket event is a READ event and/or a WRITE event, the timing is started.

In step 25, when the timing reaches a preset threshold and the Web task does not receive a first semaphore sent by a Socket underlying layer, a second semaphore is sent to the Web task, to enable the Web task to be activated, and a corresponding procedure is processed according to the Socket event.

The client request of the port of the Web server is monitored; according to the monitored client request, the interested Socket event is registered through the asynchronous selection operation; it is judged whether the Socket event is the READ event and/or the WRITE event to obtain the judgment result; when the current Socket event is the READ event and/or the WRITE event, the timing is started; when the timing reaches the preset threshold and the Web task does not receive the first semaphore, the second semaphore is sent to the Web task to enable the Web task to be activated, and the corresponding procedure is processed according to the Socket event.

In the above-mentioned method, through designing a timer, when the Web task does not receive the semaphore sent by the Socket underlying layer within the preset threshold time, one semaphore is sent to the Web task through the timer to activate the Web task, therefore, the Web server can still be visited when the client is abnormal.

Because the client has already become abnormal, the Web task needs to close the current Socket at once after being activated, which enables the client to re-initiate the connection with the Web server and realizes the operation of visiting the Web server continuously, therefore, the above-mentioned method for processing a Socket further includes the following step.

In step 26, after sending the second semaphore to the Web task to enable the Web task to be activated and processing the corresponding procedure according to the Socket event when the waiting timing reaches the preset threshold and the Web task does not receive the first semaphore sent by the Socket underlying layer, the Socket event is closed.

In the above-mentioned method for processing a Socket, wherein the platform for providing the asynchronous unblocking-mode Socket is an embedded Rex system.

In the above-mentioned method for processing a Socket, wherein the port of the Web server is an 80 port.

The Socket realization procedure provided by the present document is divided into the following steps.

The interested event of the Socket is registered (including ACCEPT, WRITE, READ, CLOSE event);

the current interested event of the Socket is judged;

the semaphore is waited when the current interested event of the Socket is the ACCEPT or the CLOSE event;

the Socket Timer is set and then the semaphore is waited when the current interested event of the Socket is the READ and/or the WRITE event;

the timer times out, and then the semaphore is sent by the Socket Timer to the Web task to activate the Web task;

the abnormal Socket is closed.

Figure 3:
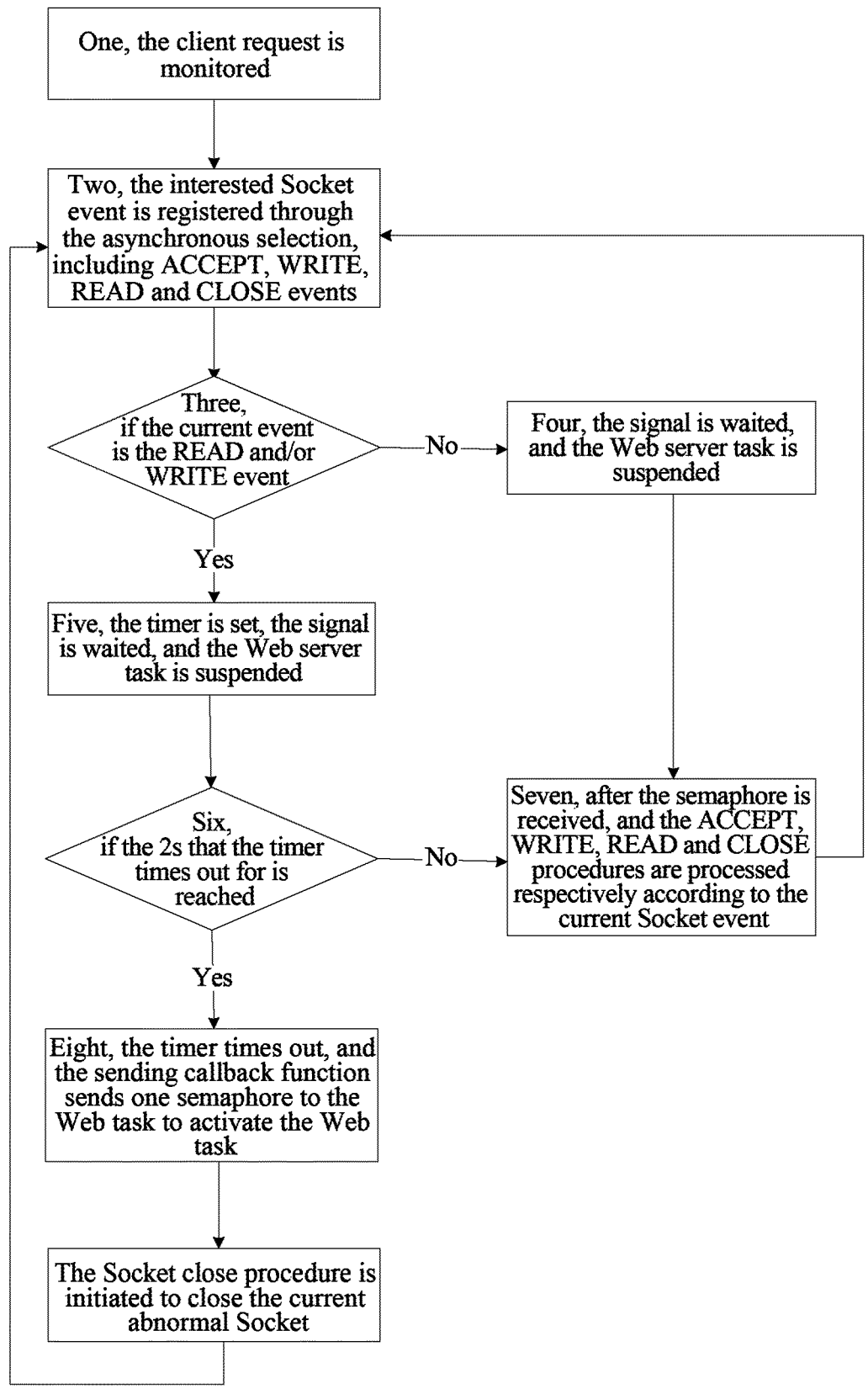
FIG. 3 is a flow chart of realizing a Socket based on an embodiment of the present invention.

The specific procedure is shown as in FIG. 3.

In step one, the client request at the 80 port is monitored constantly.

In step two, the interested Socket event is registered through the asynchronous selection, and the Socket event includes ACCEPT, WRITE, READ and CLOSE events.

In step three, it is judged what event the current interested Socket event is; if it is the ACCEPT or CLOSE event, then step five is executed. Otherwise step four is executed.

In step four, it is waiting for the Socket underlying layer to send the semaphore, and the Web task is suspended, and step six is executed.

In step five, the interested event of the Socket is the READ and/or WRITE event, the Socket Timer is set, and the semaphore of the Socket underlying layer or the semaphore sent by the timer timing out is waited, and the Web task is suspended, and step seven or step eight is executed.

In step six, after the Socket underlying layer monitors the event of the client, the callback function of the Socket is called, the callback function sends the semaphore to activate the Web task after matching the current Socket event, and then processes the accept or close procedure according to the current Socket event.

In step seven, the threshold of the waiting time is set as 2s, and the timer does not time out to the 2s, and the Socket underlying layer calls the callback function after monitoring the event of the client, and the callback function sends the semaphore to activate the Web task after matching the current Socket event, and then processes the read and/or write procedure according to the current Socket event; step two is returned.

In step eight, the timer times out for 2s, the callback function of the Socket Timer sends one semaphore to the Web task to activate the Web task. And then the Socket close procedure is initiated to close the current abnormal Socket.

Figure 4:
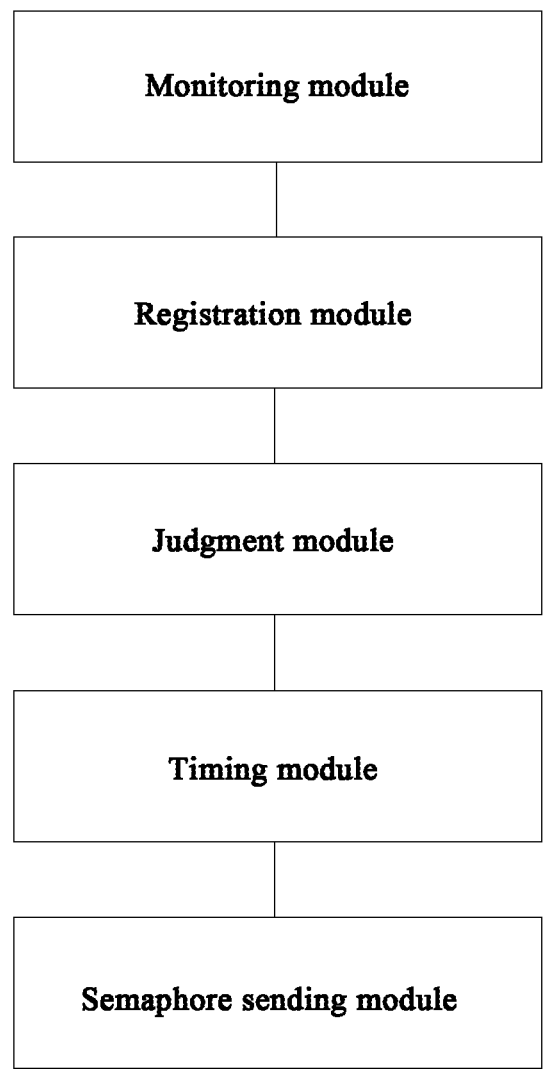
FIG. 4 is a structure diagram of an apparatus for processing a Socket in an embodiment of the present invention.

The embodiment of the present invention further provides an apparatus for processing a Socket, applied in a Web server, wherein the Web server is based on an embedded Rex system; as shown in FIG. 4, the apparatus for processing a Socket includes:

a monitoring module, configured to: monitor a client request of a port of the Web server;

a registration module, configured to: according to the monitored client request, register a Socket event through an asynchronous selection operation;

a judgment module, configured to: judge whether the Socket event is a READ event and/or a WRITE event, to obtain a judgment result;

a timing module, configured to: when the judgment result indicates that the Socket event is a READ event and/or a WRITE event, start timing;

a semaphore sending module, configured to: when the timing reaches a preset threshold and the Web task does not receive a first semaphore sent by a Socket underlying layer, send a second semaphore to the Web task, to enable the Web task to be activated, and process a corresponding procedure according to the Socket event.

The above-mentioned apparatus for processing a Socket further includes:

a Socket closing module, configured to: after sending a second semaphore to the Web task, to enable the Web task to be activated, and processing a corresponding procedure according to the Socket event when the waiting timing reaches a preset threshold and the Web task does not receive a first semaphore sent by a Socket underlying layer, close the Socket event.

In the above-mentioned apparatus for processing a Socket, wherein the platform for providing the asynchronous unblocking-mode Socket is an embedded Rex system.

In the above-mentioned apparatus for processing a Socket, wherein the port of the Web server is an 80 port.

The embodiment of the present invention further provides a Web server, which is based on the platform for providing the asynchronous unblocking-mode Socket, including the apparatus for processing a Socket described in any one of the above-mentioned descriptions.

The above description is the preferable embodiments of the present invention. It should be pointed out, for those skilled in the art, a plurality of modifications and retouches also can be made without departing from the principles of the patent document, and all the modifications and retouches should be embodied in the protection scope of the patent document.

INDUSTRIAL APPLICABILITY

In the embodiment of the present invention, when the client is abnormal and when the Web task is suspended all the time because of being unable to receive the semaphore, the timing is started; when the timing reaches the preset threshold and the Web task does not receive the first semaphore sent by the Socket underlying layer, the second semaphore is sent to activate the Web task, which enables the Web task to process the corresponding procedures according to the Socket event and close the abnormal Socket event, so that the client re-initiate the connection with the Web server end, to realize the operation of visiting the Web server continuously, that is, the Web server can still be visited.

What we claim is:

1. A method for processing a Socket, applied in a Web server, wherein the Web server is based on a platform for providing an asynchronous unblocking-mode Socket; and the method for processing the Socket comprises:

monitoring a client request of a port of the Web server;

according to the monitored client request, registering a Socket event through an asynchronous selection operation;

judging whether the Socket event is a READ event and/or a WRITE event, to obtain a judgment result;

when the judgment result indicates that the Socket event is a READ event and/or a WRITE event, starting timing;

when the timing reaches a preset threshold and the Web task of the Web server does not receive a first semaphore sent by a Socket underlying layer, sending a second semaphore to the Web task, to enable the Web task to be activated, and processing a corresponding procedure according to the Socket event;

after sending the second semaphore to the Web task, to enable the Web task to be activated, and processing the corresponding procedure according to the Socket event when the timing reaches the preset threshold and the Web task does not receive the first semaphore sent by the Socket underlying layer, closing the Socket event.

2. The method for processing the Socket according to claim 1, wherein the platform for providing the asynchronous unblocking-mode Socket is an embedded Rex system.

3. The method for processing the Socket according to claim 1, wherein the port of the Web server is an 80 port.

* * * * *